US012738111B2

(12) United States Patent
Kamo et al.

(10) Patent No.: US 12,738,111 B2
(45) Date of Patent: Sep. 15, 2026

(54) DATA WRITING METHOD, RECORDING MEDIUM, AND VEHICLE

(71) Applicant: Panasonic Intellectual Property Management Co., Ltd., Osaka (JP)

(72) Inventors: Hiroyuki Kamo, Osaka (JP); Tsubasa Miyamae, Osaka (JP); Yuji Asano, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 51 days.

(21) Appl. No.: 18/914,178

(22) Filed: Oct. 13, 2024

(65) Prior Publication Data

US 2025/0131780 A1 Apr. 24, 2025

(30) Foreign Application Priority Data

Oct. 20, 2023 (JP) ................................ 2023-181398

(51) Int. Cl.
*G07C 5/08* (2006.01)
*H04L 67/00* (2022.01)

(52) U.S. Cl.
CPC .............. *G07C 5/085* (2013.01); *H04L 67/34* (2013.01)

(58) Field of Classification Search
CPC ................................ G07C 5/085; H04L 67/34
See application file for complete search history.

(56) References Cited

U.S. PATENT DOCUMENTS

| | | | | |
|---|---|---|---|---|
| 11,124,266 | B2 * | 9/2021 | Shahana | B62K 25/286 |
| 11,755,312 | B2 * | 9/2023 | Lohmeyer | G06F 8/654<br>717/169 |
| 12,072,954 | B1 * | 8/2024 | Li | G06F 18/2148 |
| 12,384,487 | B2 * | 8/2025 | Misgeld | B62M 6/60 |
| 2020/0363296 | A1 * | 11/2020 | Westlund | G06N 7/01 |
| 2020/0387367 | A1 * | 12/2020 | Eklund | H04L 9/0825 |
| 2020/0388091 | A1 * | 12/2020 | Ropel | H04L 9/0637 |
| 2021/0337029 | A1 * | 10/2021 | Breitkreutz | H04L 69/16 |
| 2023/0229417 | A1 * | 7/2023 | Qian | H04L 67/34<br>717/170 |
| 2023/0229425 | A1 * | 7/2023 | Lohmeyer | G06F 9/4401<br>717/169 |

FOREIGN PATENT DOCUMENTS

| | | | | |
|---|---|---|---|---|
| CN | 109606333 A * | 4/2019 | | B60T 8/885 |
| JP | 2023-050763 A | 4/2023 | | |

OTHER PUBLICATIONS

CN-109606333-A translation (Year: 2019).*

* cited by examiner

*Primary Examiner* — Frederick M Brushaber
(74) *Attorney, Agent, or Firm* — Renner, Otto, Boisselle & Sklar, LLP

(57) ABSTRACT

A data writing method includes obtaining and writing. In the obtaining, a trained model constructed in advance by machine learning to estimate a state of a vehicle that is one of a human-powered vehicle or an electric bicycle is obtained. In the writing, the trained model obtained in the obtaining is written, in a nonvolatile memory area of a semiconductor memory, to a third area that is different from both a first area in which a bootloader is stored and a second area in which an application that references the trained model is stored.

6 Claims, 7 Drawing Sheets

80
71
13a
13
11b
18
14
63
11a3
16
16
17a
17
17b
72
11, 11a
11a2
81
15
12
12a
11a4
11a1
2

100
A1
A2
Bootloader
Application
AI model
0x08000000
0x08008000
0x0803ffff
(a)
42
A1
A2
A3
Bootloader
Application
AI model
0x08000000
0x08008000
0x08038000
0x0803ffff
(b)

200

201

Type1 (26 inches)

Type1 (24 inches)

Type2 (26 inches)

...

Type3

Type4

Type5

...

203

Verify

202

Model writing

FIG. 6

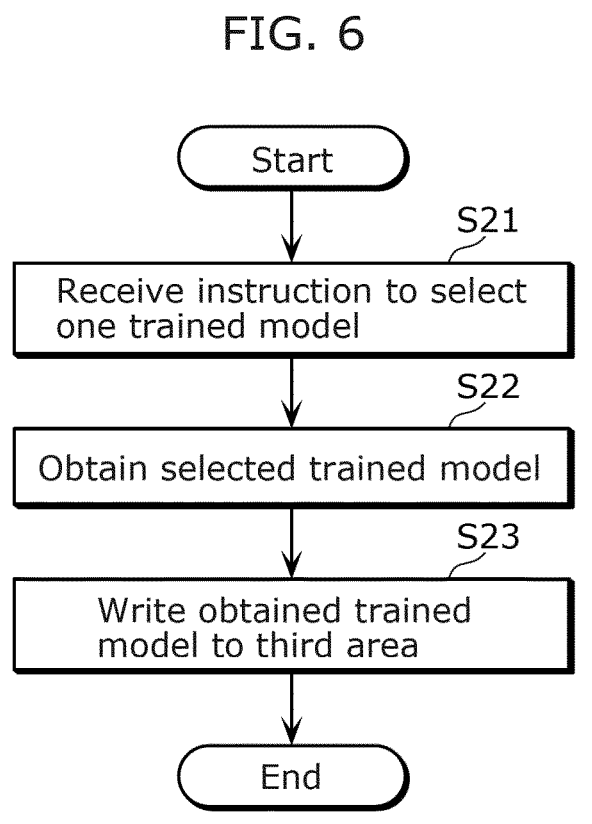

Start

S21

Receive instruction to select one trained model

S22

Obtain selected trained model

S23

Write obtained trained model to third area

End

2A
Electric bicycle
40
Control device
41
Controller
411
Obtainer
412
Estimator
30
Sensor
First semiconductor memory
Second semiconductor memory
42
421
422
Informer
50
Operation unit
61
Manual switch
62
Battery
63
Electric motor
43

DATA WRITING METHOD, RECORDING MEDIUM, AND VEHICLE

CROSS REFERENCE TO RELATED APPLICATIONS

This application claims the benefit of priority of Japanese Patent Application Number 2023-181398, filed on Oct. 20, 2023, the entire content of which is hereby incorporated by reference.

TECHNICAL FIELD

The present disclosure relates to a data writing method, a recording medium, and a vehicle.

BACKGROUND ART

Patent Literature 1 (PTL 1) discloses a monitoring system for bicycles. The monitoring system includes: a forward-looking monitoring device that monitors an area ahead of a bicycle in a traveling direction of the bicycle; and a control device. The control device includes a trained model to which a detection result of the forward-looking monitoring device is inputted and which outputs a result of determination as to whether the detection result includes an obstacle. The trained model is stored in a memory of the forward-looking monitoring device.

CITATION LIST

Patent Literature

PTL 1: Japanese Unexamined Patent Application Publication No. 2023-50763

SUMMARY

The present disclosure provides a data writing method, a recording medium, and a vehicle capable of facilitating writing of a trained model to a semiconductor memory.

A data writing method according to one aspect of the present disclosure includes obtaining and writing. In the obtaining, a trained model constructed in advance by machine learning to estimate a state of a vehicle that is one of a human-powered vehicle or an electric bicycle is obtained. In the writing, the trained model obtained in the obtaining is written, in a nonvolatile memory area of a semiconductor memory, to a third area that is different from both a first area in which a bootloader is stored and a second area in which an application that references the trained model is stored.

A recording medium according to one aspect of the present disclosure is a non-transitory computer-readable recording medium having recorded thereon a program for causing one or more processors to execute the data writing method described above.

A vehicle according to one aspect of the present disclosure is one of a human-powered vehicle or an electric bicycle. The vehicle includes: a body; a semiconductor memory to which data has been written using the data writing method described above; and a controller. The controller references the trained model stored in the third area of the semiconductor memory to execute the application stored in the second area.

The data writing method, etc. according to the present disclosure provide an advantage of facilitating the writing of the trained model to the semiconductor memory.

BRIEF DESCRIPTION OF THE DRAWINGS

The figures depict one or more implementations in accordance with the present teaching, by way of examples only, not by way of limitations. In the figures, like reference numerals refer to the same or similar elements.

FIG. 6 is a flowchart showing a second writing example of the data writing method according to the embodiment.

DESCRIPTION OF EMBODIMENT

Figure 1:
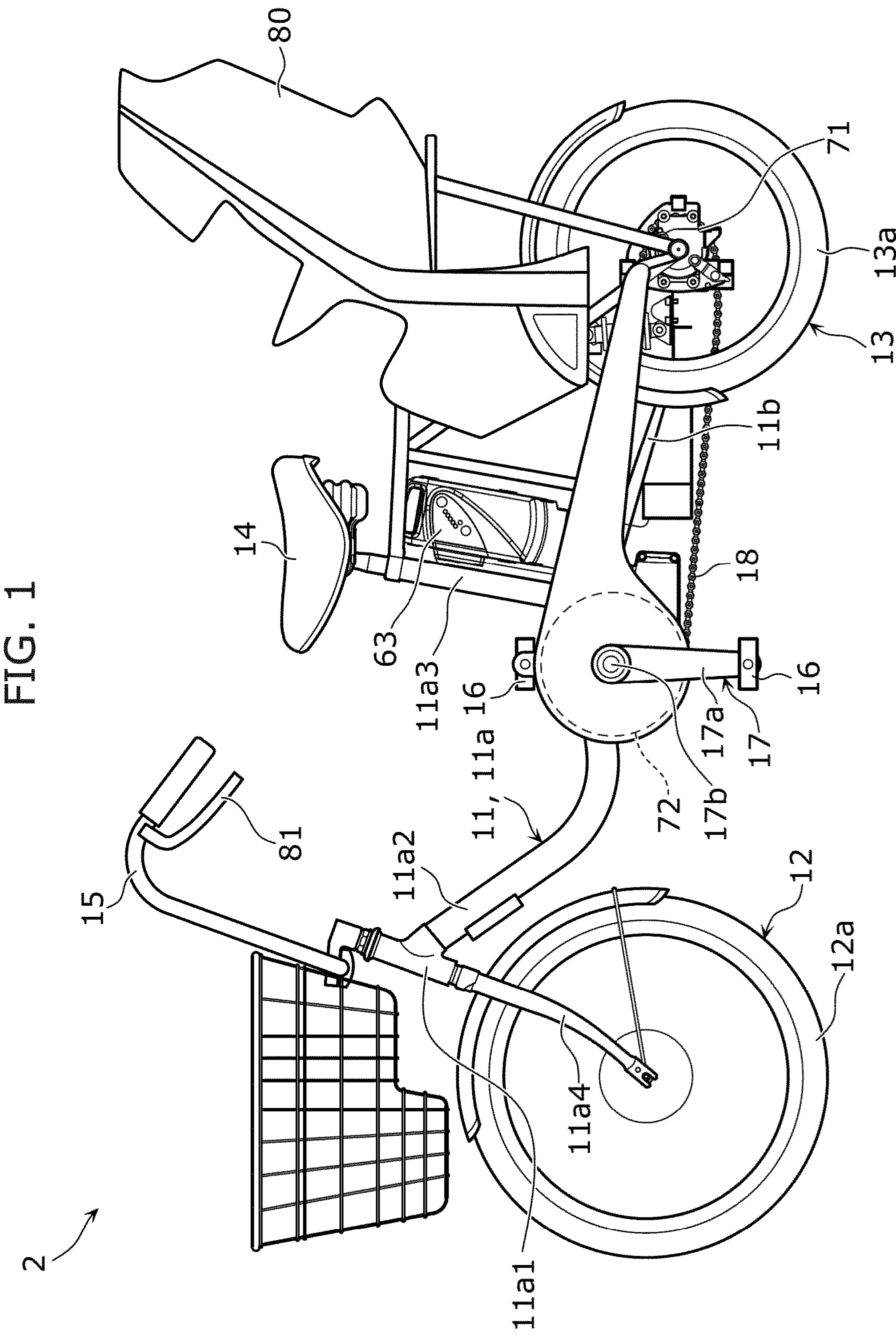
FIG. 1 is a side view illustrating an electric bicycle according to an embodiment.

An embodiment of the present disclosure will be described below in detail using the drawings. Note that the embodiment to be described below shows a specific example of the present disclosure. The numerical values, shapes, materials, elements, the arrangement and connection of the elements, steps, the processing order of the steps, etc. shown in the following embodiment are mere examples, and therefore do not limit the scope of the present disclosure. Among the elements in the following embodiment, those not recited in any one of the independent claims are therefore described as optional elements.

Each of the figures is a schematic diagram and is not necessarily drawn in a strict sense. Therefore, the scale, for example, is not necessarily the same in these figures. In addition, substantially the same configurations are denoted by the same reference numeral throughout the figures, and redundant descriptions will be omitted or simplified.

A data writing method, a program, and a vehicle according to the embodiment will be described below.

Embodiment

[Vehicle]

First, a configuration of a vehicle will be described using FIGS. 1 and 2. In the embodiment, the vehicle is electric bicycle 2. Electric bicycle 2 is a vehicle capable of traveling on a running surface by electric power, e.g., a power assisted bicycle, or a self-propelled vehicle such as what is called an e-scooter. Electric bicycle 2 may be a vehicle that requires no driver's license for a user. In the embodiment, electric bicycle 2 is a two-wheeled bicycle having two wheels, i.e., a front wheel and a rear wheel, but electric bicycle 2 is not limited to this. For example, electric bicycle 2 may be a three-wheeled bicycle in which one of a front wheel or a rear wheel is one-wheeled and the other of the front wheel or the rear wheel is two-wheeled.

Here, the vehicle is not limited to electric bicycle 2, but may also be a human-powered vehicle in which wheels are powered by a pedal force. Human-powered vehicles may include, for example, bicycles. Although the power assisted bicycle is classified as electric bicycle 2 as mentioned above, the power assisted bicycle may also be classified as a human-powered vehicle. As just described, the vehicle is either the human-powered vehicle or electric bicycle 2 in the embodiment. As an example, the following description will be provided assuming that electric bicycle 2 is the vehicle.

Figure 2:
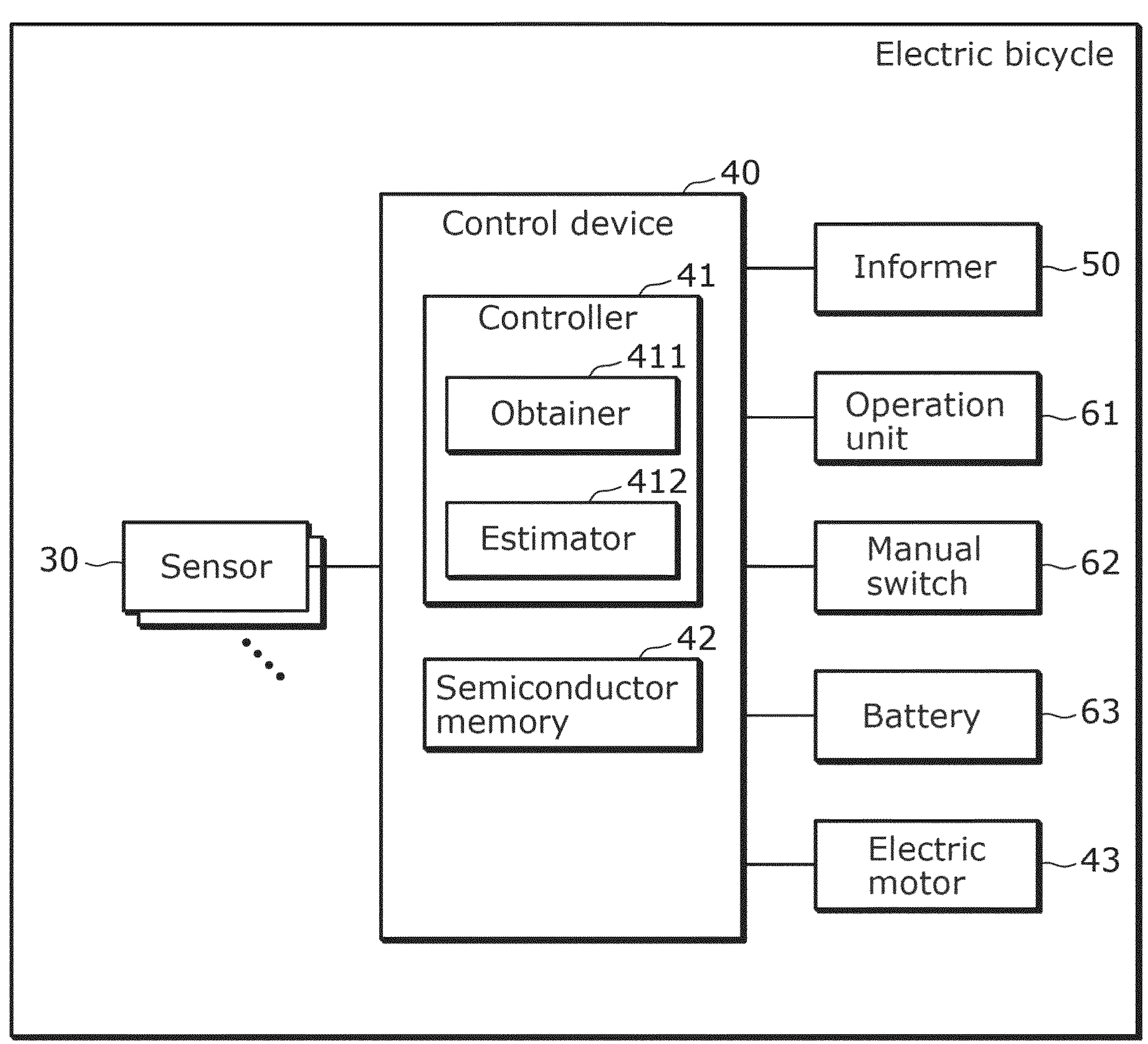
FIG. 2 is a block diagram illustrating the electric bicycle according to the embodiment.

FIG. 1 is a side view illustrating electric bicycle 2 according to the embodiment. FIG. 2 is a block diagram illustrating electric bicycle 2 according to the embodiment. As shown in FIGS. 1 and 2, electric bicycle 2 is a vehicle capable of traveling on a running surface by rotation of wheels. In the embodiment, electric bicycle 2 is a power assisted bicycle in which a pedal force exerted by the user is assisted by an auxiliary driving force of electric motor 43. In electric bicycle 2, a human-powered driving force for which the wheels are powered by the pedal force and the auxiliary driving force for which the wheels are powered by electric motor 43 may be independent of each other. Electric bicycle 2 may thus be a bicycle capable of traveling (capable of being self-propelled) only with electric motor 43.

For example, electric bicycle 2 has an assist mode, a walking mode, and a self-propelled mode. The assist mode is a mode to assist forward movement of electric bicycle 2 based on the pedal force exerted on pedals 16 by the user. The walking mode is a mode to assist, when the user walks electric bicycle 2, forward movement of electric bicycle 2 based on a force exerted by the user to push electric bicycle 2 forward. The self-propelled mode is a mode to assist forward movement of electric bicycle 2 when the user walks while supporting electric bicycle 2.

Electric bicycle 2 includes frame (body) 11, front wheel 12, rear wheel 13, saddle 14, handlebar 15, pedals 16, crank 17, chain 18, a derailleur, one or more sensors 30, control device 40, electric motor 43, informer 50, operation unit 61, manual switch 62, and battery 63.

Front wheel 12, rear wheel 13, saddle 14, handlebar 15, pedals 16, crank 17, chain 18, the derailleur, one or more sensors 30, electric motor 43, control device 40, informer 50, operation unit 61, manual switch 62, and battery 63, for example, are attached to frame 11. Frame 11 is a framework of electric bicycle 2. Frame 11 is made of a metal such as an aluminum alloy, iron, chrome molybdenum steel, steel, or titanium, for example. Note that frame 11 may also be made of carbon or a synthetic resin, for example.

Frame 11 includes front frame 11*a* and rear frame 11*b*.

Front frame 11*a* constitutes a front part of frame 11. Front frame 11*a* includes head tube 11*a*1, down tube 11*a*2, and seat tube 11*a*3. Note that frame 11 may be configured to include a suspension.

Head tube 11*a*1 is connected to a front end of front frame 11*a*. Front fork 11*a*4 and handlebar 15 are attached to head tube 11*a*1 so as to be rotatable around an axis along a longitudinal direction of head tube 11*a*1. Front wheel 12 is rotatably attached to front fork 11*a*4. By turning handlebar 15 to the left or to the right, the direction of front wheel 12 supported by front fork 11*a*4 can be turned to the left or to the right. A front light is also attached to front fork 11*a*4. Note that front fork 11*a*4 may be configured to include a suspension.

Down tube 11*a*2 connects between head tube 11*a*1 and seat tube 11*a*3.

Seat tube 11*a*3 holds saddle 14. Saddle 14 is attached to seat tube 11*a*3 so as to be movable along a longitudinal direction of seat tube 11*a*3. A lower end of seat tube 11*a*3 is connected to a rear end of down tube 11*a*2. Seat tube 11*a*3 is located between front wheel 12 and rear wheel 13 in a front-rear direction. Battery 63 is removably attached to seat tube 11*a*3.

Rear frame 11*b* is disposed more rearward than front frame 11*a* and constitutes a rear part of frame 11. Rear wheel 13, rear sprocket 71 engaged with an axle of rear wheel 13, and rear seat 80 are attached to rear frame 11*b*. Chain 18 is looped over rear sprocket 71 and front sprocket 72. As a result, a rotative force of front sprocket 72, which has been rotated as a result of pedals 16 being pushed down, is transmitted to rear wheel 13 via chain 18 and rear sprocket 71. In the embodiment, pedals 16, front sprocket 72, rear sprocket 71, and chain 18 together constitute a rear wheel drive mechanism, which relies on human power.

Front wheel 12 includes tire 12*a* used for the vehicle (electric bicycle 2) to travel. Front wheel 12 is a front-side wheel of the two wheels aligned in the front-rear direction. Front wheel 12 is supported by front fork 11*a*4 so as to be rotatable around an axis along a left-right direction. Note that front wheel 12 may receive power transmission from electric motor 43. For example, front wheel 12 may be provided with a motor for providing a driving force to rotate front wheel 12. Front wheel 12 is an example of wheels.

Rear wheel 13 includes tire 13*a* used for the vehicle (electric bicycle 2) to travel. Rear wheel 13 is a rear-side wheel of the two wheels aligned in the front-rear direction. Rear wheel 13 is supported by a rear fork so as to be rotatable around an axis along the left-right direction. Note that rear wheel 13 may receive power transmission from electric motor 43. For example, rear wheel 13 may be provided with a motor for providing a driving force to rotate rear wheel 13. Rear wheel 13 is an example of wheels. Note that front wheel 12 and rear wheel 13 may be referred to collectively as a wheel.

Rear wheel 13 includes rear sprocket 71. Rear sprocket 71 is coupled to front sprocket 72 via chain 18. In the embodiment, the power outputted from electric motor 43 is transmitted to rear wheel 13.

Saddle 14 is a part on which the user sits. Saddle 14 is movably attached to seat tube 11*a*3.

When the user steers electric bicycle 2, for example, handlebar 15 is used to change a steering angle of electric bicycle 2. A pair of grips and a pair of brake levers 81 are provided at both ends of handlebar 15. The pair of grips are parts to be held by the hands of the user when the user rides electric bicycle 2 in a proper posture. Also when the user walks electric bicycle 2 or walks while supporting electric bicycle 2, the pair of grips are held by the hands and receive a forward pushing force. One of brake levers 81 provides a mechanical braking force to front wheel 12 by driving a front braking device (not shown). The other of brake levers 81 provides a mechanical braking force to rear wheel 13 by driving a rear braking device (not shown).

Note that at least one of the pair of grips may be provided with a grip sensor for detecting a gripping force or a pushing force. Note that a steering angle sensor for measuring a steering angle of handlebar 15 may be provided in a rotation shaft provided at a center of handlebar 15, and this steering angle sensor may detect a steering angle of handlebar 15. Note that a brake sensor may be provided on brake lever 81, and this brake sensor may detect an operation to brake lever 81.

When the user rides electric bicycle 2, for example, a pedal force is applied to pedals 16 by the user. Pedal 16 is attached to one of longitudinal ends of each of crank arms 17*a* that is opposite to crankshaft 17*b*. Pedal 16 is rotatably attached to crank arm 17*a*. A rotation shaft of pedal 16 is substantially parallel to a rotation shaft of crankshaft 17*b* of crank 17.

Crank 17 includes crankshaft 17*b*, the pair of crank arms 17*a*, and front sprocket 72.

Crank arms 17*a* are provided one on each side of front frame 11*a* and fixed to both ends of crankshaft 17*b* extending in the left-right direction. One end of crank arm 17*a* is rotatably fixed to crankshaft 17*b*, and pedal 16 is rotatably fixed to the other end of crank arm 17*a*. Front sprocket 72 is attached to crankshaft 17*b* of crank arms 17*a* to rotate with rotation of crankshaft 17*b*. When a pedal force is applied to pedal 16 by the user, crank arm 17*a* rotates around crankshaft 17*b*, thereby causing front sprocket 72 to rotate around crankshaft 17*b* as well. With the rotation of front sprocket 72, the human-powered driving force resulting from the pedal force is transmitted to rear sprocket 71 of rear wheel 13 via chain 18. As a result, rear sprocket 71 is rotated, and rear wheel 13 is thereby rotated. For example, when electric bicycle 2 operates in the assist mode, the human-powered driving force resulting from the pedal force and the auxiliary driving force added to such a human-powered driving force by electric motor 43 are transmitted to rear wheel 13.

Chain 18 transmits, to rear sprocket 71, the rotative force of front sprocket 72, which has been rotated as a result of pedals 16 being pushed down, and the auxiliary driving force outputted from electric motor 43. Chain 18 is a power transmitter such as a belt, a shaft, a wire, or a gear, for example.

The derailleur is configured with a well-known speed change mechanism such as a planetary gear or a multispeed gear having a plurality of driving force transmission paths with gear ratios different from one another. For example, the derailleur can be shifted to a low speed (Low gear), a middle speed (Middle gear), a high speed (Top gear), etc. by being shifted among the driving force transmission paths. The derailleur may be configured to be manually shifted among the driving force transmission paths or electrically shifted among the driving force transmission paths.

One or more sensors 30 each obtain vehicle information about electric bicycle 2. The vehicle information is information indicating a speed of electric bicycle 2 or information indicating an acceleration of electric bicycle 2, for example. The vehicle information may also include information indicating the number of revolutions of crank 17, information indicating the human-powered driving force, or information indicating an angular velocity of electric bicycle 2, for example. In the embodiment, electric bicycle 2 is equipped with one or more sensors 30 including at least a vibration sensor. In addition to the vibration sensor, one or more sensors 30 may include a speed sensor, an acceleration sensor, a crank rotation sensor, a gyro sensor, a torque sensor, or a sound sensor, for example. One or more sensors 30 each output information indicating its detection result to control device 40.

The vibration sensor detects vibration of a target part in the vehicle (electric bicycle 2). Here, the vibration of the target part to be detected by the vibration sensor is different from a sound emitted by the target part. The speed sensor is a sensor for detecting a speed at which electric bicycle 2 is traveling during the execution of the assist mode, the walking mode, or the self-propelled mode. The acceleration sensor is a sensor for detecting an acceleration of traveling electric bicycle 2. The crank rotation sensor is a sensor for detecting the number of revolutions of crank 17 per unit time during the execution of the assist mode, the walking mode, or the self-propelled mode. The gyro sensor is a six-axis sensor for detecting a velocity (angular velocity) at which the vehicle tilts. The torque sensor is a sensor for detecting a human-powered driving force generated by the rotation of crankshaft 17*b* resulting from the pedal force on pedal 16. The sound sensor is a sensor for detecting a sound emitted from the target part in the vehicle. The sound is a sound emitted from front sprocket 72, rear sprocket 71, chain 18, a braking device, tires 12*a* and 13*a*, or the derailleur, for example.

In the embodiment, the vibration sensor, the speed sensor, the acceleration sensor, the crank rotation sensor, the gyro sensor, the torque sensor, and the sound sensor are given as an example of one or more sensors 30 included in electric bicycle 2. However, one or more sensors 30 included in electric bicycle 2 are not limited to these. For example, one or more sensors 30 may include a tilt sensor for detecting a tilt of the vehicle (electric bicycle 2) with respect to a horizontal plane. For example, one or more sensors 30 may also include a battery sensor for detecting a state of battery 63, such as a charging rate, discharge performance, or a remaining capacity of battery 63. For example, one or more sensors 30 may also include a motor rotation sensor for detecting the number of revolutions of electric motor 43 per unit time.

One or more sensors 30 only need to include at least a sensor for detecting data to be inputted to a trained model (also referred to as an "artificial intelligence (AI) model") described later, and need not include all of the above-described sensors.

Electric motor 43 adds an auxiliary driving force to assist the traveling of the vehicle (electric bicycle 2). Electric motor 43 is driven by receiving electric power from battery 63 according to control by control device 40. Electric motor 43 rotates rear wheel 13 by transmitting a rotational torque as the auxiliary driving force to rear sprocket 71 via chain 18. The rotational torque refers to the auxiliary driving force, which is a driving force generated by electric motor 43 to be added to the human-powered driving force, and an auxiliary driving force, which is an auxiliary force to be added to a force for the user to walk electric bicycle 2 or to walk while supporting electric bicycle 2. During the execution of the assist mode, electric motor 43 adds the auxiliary driving force to the human-powered driving force resulting from the pedal force applied to pedals 16. During the execution of the walking mode, electric motor 43 also adds the auxiliary driving force to the force to walk electric bicycle 2. During the execution of the self-propelled mode, electric motor 43 also adds the auxiliary driving force for electric bicycle 2 to be self-propelled while being supported by the user.

In the embodiment, electric motor 43 is housed, together with control device 40, etc., in a casing made of a resin or a metal as a unit. The crank rotation sensor and the torque sensor, for example, are provided inside the casing.

Control device 40 is implemented by a microcomputer (microcontroller), for example. Control device 40 is configured to include: a nonvolatile memory (semiconductor memory 42 described later) in which an application including a program, etc., and a trained model are stored; a volatile memory (storage), which is a temporary storage area for executing the program; an input and output port; and a processor for executing the program, for example. Note that control device 40 may be implemented by a dedicated electronic circuit.

One or more sensors 30, electric motor 43, operation unit 61, manual switch 62, battery 63, and the front light, for example, are electrically connected to control device 40. Operation signals from operation unit 61 and manual switch

62, and information indicating the detection results from the sensors are inputted to control device 40.

Control device 40 drives electric motor 43 according to an operation mode of electric bicycle 2. Specifically, control device 40 switches the operation mode among the assist mode, the walking mode, and the self-propelled mode and executes the respective modes. The assist mode is executed when the user is riding electric bicycle 2 after manual switch 62 has been pressed to turn on a power source. When the assist mode is executed, control device 40 determines a magnitude of the auxiliary driving force to be generated by electric motor 43 based on the pedal force applied to pedals 16 and the speed of electric bicycle 2, for example. The walking mode is executed when the user is not riding electric bicycle 2, manual switch 62 has been pressed to turn on the power source, and the user walks electric bicycle 2. As with the walking mode, the self-propelled mode is executed when the user is not riding electric bicycle 2 and walks while supporting electric bicycle 2. In the self-propelled mode, the user is not applying any force to push electric bicycle 2 forward. When executing the walking mode, control device 40 also determines a magnitude of the auxiliary driving force to be generated by electric motor 43 based on the force to walk electric bicycle 2 and the speed of electric bicycle 2, for example. When executing the self-propelled mode, control device 40 also determines a magnitude of a predetermined auxiliary driving force to be generated by electric motor 43.

Control device 40 also provides power supplied from battery 63 to electric motor 43, one or more sensors 30, and the front light, for example.

In the embodiment, control device 40 is housed inside the casing in which electric motor 43 is housed, but is not limited to this. Control device 40 may be provided separately from electric motor 43.

Informer 50 is a communication module capable of wireless communication or wired communication with an external device. Informer 50 can inform the external device of an estimation result of estimator 412 described later. The external device is a cloud server managed by a servicer that owns a plurality of vehicles (electric bicycles 2) and rents out the vehicles, for example. Note that informer 50 may be able to communicate directly with a terminal device owned by the user riding electric bicycle 2. The terminal device is a smartphone, a tablet terminal, a personal computer, or a cycle computer, for example. In such a case, the terminal device corresponds to the external device.

Operation unit 61 is provided in the vicinity of one of the pair of brake levers 81, for example. Operation unit 61 is an operation terminal such as a cycle computer including a light switch (illustration omitted) for turning on the front light, for example. Operation unit 61 includes buttons for receiving operations by the user, for example. The buttons are touch panel buttons or mechanical buttons, for example.

Operation unit 61 includes a display that displays the estimation result of estimator 412. The display is a liquid crystal display or an organic EL display, for example. Operation unit 61 may also include a sounder, such as an electronic bell, for informing the surroundings of the vehicle (electric bicycle 2) about the estimation result of estimator 412 by means of a sound. The sounder may be a speaker for outputting a sound, for example. Operation unit 61 may also be a vibrator for informing the user of the estimation result of estimator 412 by means of vibration. The vibrator may be a vibration generating device having a vibration generating function (vibration function) for transmitting vibration to the user by causing operation unit 61 to vibrate. The vibration generating device may be a vibration motor that generates vibration, for example. Operation unit 61 may also be a light source for informing the user of the estimation result of estimator 412 by means of light. The light source may be an LED module that emits monochromatic light or multi-colored light, for example.

Manual switch 62 is a mechanical switch that receives a walk-the-vehicle operation or an operation for causing the vehicle to be self-propelled to execute the walking mode or the self-propelled mode. During a period in which manual switch 62 is being pressed by the user, operation unit 61 continues to output, to control device 40, a mode-on signal to execute the walking mode or the self-propelled mode. During a period in which no manual switch 62 is being pressed, on the other hand, operation unit 61 outputs no mode-on signal to control device 40.

If manual switch 62 is pressed once, then the walking mode or the self-propelled mode may be executed without manual switch 62 being pressed continuously. If manual switch 62 is pressed again during the execution of the walking mode or the self-propelled mode, the walking mode or the self-propelled mode may be stopped.

Battery 63 is a storage battery that stores electric power for driving electric motor 43, etc. Battery 63 is, for example, a secondary battery, but may also be a capacitor or the like. Battery 63 is electrically connected to electric motor 43. Specifically, battery 63 supplies electric power to electric motor 43, etc.

[Control Device]

Next, control device 40 will be described specifically. Control device 40 includes controller 41 and semiconductor memory 42. Controller 41 implements a function of obtainer 411 and a function of estimator 412 by executing an application, including a program, etc., stored in semiconductor memory 42.

Obtainer 411 obtains vehicle information about the vehicle (electric bicycle 2). In the embodiment, obtainer 411 obtains, as the vehicle information, vibration information from the vibration sensor among one or more sensors 30, which is provided in the target part for estimating a state of the vehicle. The vibration information may include information indicating mechanical vibration generated in a part of the vehicle (electric bicycle 2) or information indicating a sound emitted from a part of the vehicle, for example. In the embodiment, the target part is a wheel (front wheel 12 or rear wheel 13) of the vehicle, for example. Note that obtainer 411 may obtain vibration information not from the vibration sensor provided in the target part, but from a vibration sensor provided in the vicinity of the target part. For example, if the target part is a wheel of the vehicle, obtainer 411 may obtain vibration information from a vibration sensor provided on frame 11.

Estimator 412 estimates a state of the vehicle (electric bicycle 2) based on the vehicle information obtained by obtainer 411. For example, estimator 412 estimates, as the state of the vehicle, a state of a part included in the vehicle. In other words, estimator 412 estimates a state of a target part as the state of the vehicle. In the embodiment, estimator 412 estimates a state of the wheel of the vehicle (here, air pressures of tires **12*a* and 13*a*) based on the vibration information obtained by obtainer 411**.

Estimator 412 estimates the air pressures of tires **12*a* and 13*a* based on the vibration information using a trained model constructed in advance by machine learning using training data. In other words, by constructing, in advance, the trained model having gone through machine learning to output whether the air pressures of tires 12*a* and 13*a* are smaller than or equal to a predetermined value using the vibration information as an input, estimator 412 can estimate whether the state of the target part (here, the state of the wheel of the vehicle) is abnormal or normal. Estimator 412 outputs the estimated result to an external device via informer 50 or to operation unit 61** to inform the surroundings of the vehicle of the estimated result.

Semiconductor memory 42 is a nonvolatile memory such as an electrically erasable programmable read-only memory (EEPROM) or a flash memory, for example. An application that implements the function of obtainer 411 and the function of estimator 412, and a trained model to be referenced when executing the application are stored in semiconductor memory 42. In addition, a bootloader is stored in semiconductor memory 42.

Figure 3:
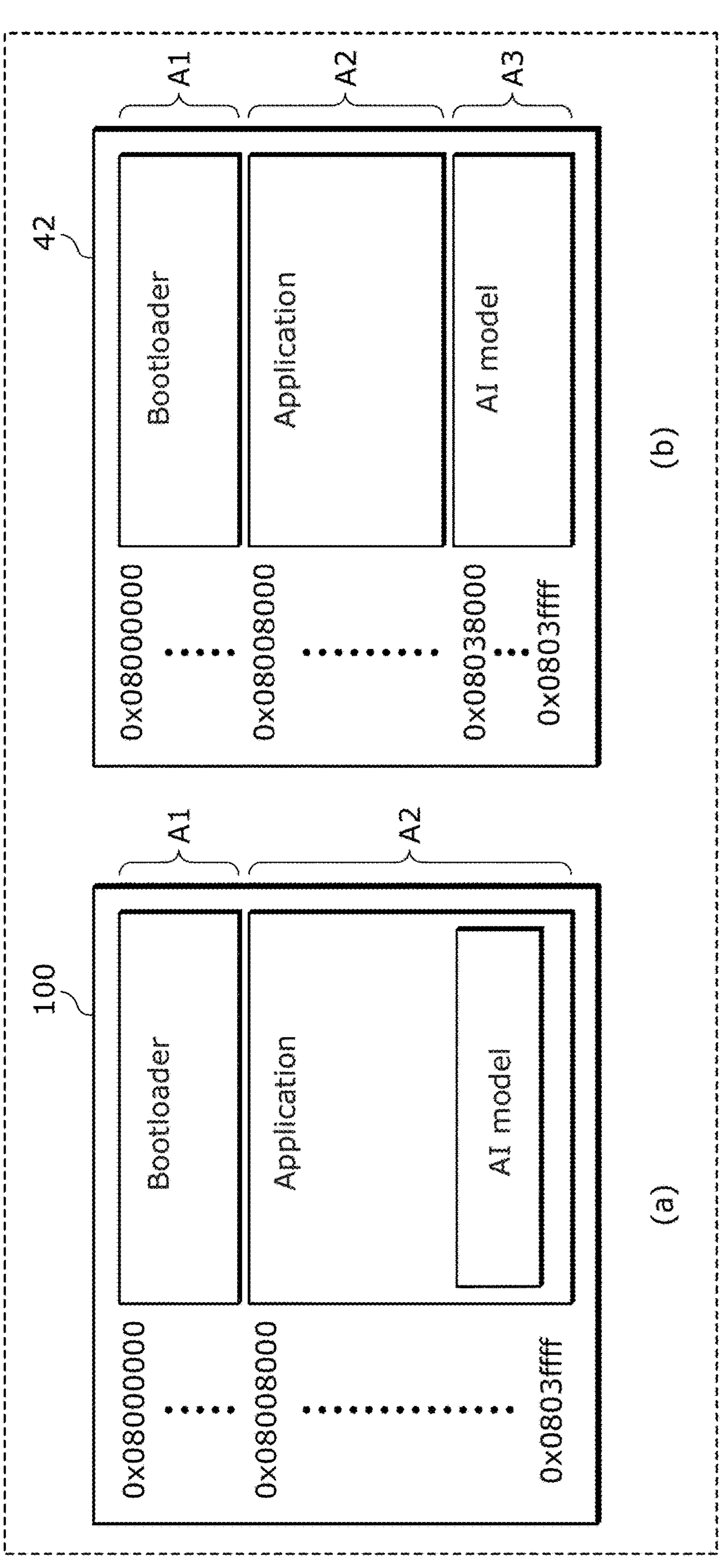
FIG. 3 is a diagram for explaining a data writing method according to the embodiment.

In the embodiment, as shown in FIG. 3 described below, the bootloader is stored in first area A1 in a nonvolatile memory area of semiconductor memory 42. The application that references the trained model is stored in second area A2, which is different from first area A1. The trained model is stored in third area A3, which is different from first area A1 and second area A2. In other words, first area A1 in which the bootloader is stored, second area A2 in which the application is stored, and third area A3 in which the trained model is stored are logically divided in the nonvolatile memory area of semiconductor memory 42.

[Data Writing Method]

A method of writing data to semiconductor memory 42 will be described next. FIG. 3 is a diagram for explaining the data writing method according to the embodiment. (a) of FIG. 3 illustrates a diagram showing an example of semiconductor memory 100 to which data has been written using a data writing method according to a comparative example. (b) of FIG. 3 illustrates a diagram showing an example of semiconductor memory 42 to which data has been written using the data writing method according to the embodiment.

First, the data writing method according to the comparative example will be described. As shown in (a) of FIG. 3, in the data writing method according to the comparative example, a bootloader is written in first area A1 in a nonvolatile memory area of semiconductor memory 100, and an application in which a trained model is embedded is written to second area A2. In the example shown in (a) of FIG. 3, the bootloader is stored in first area A1 indicated by addresses 0x08000000 to 0x08007fff in semiconductor memory 100. The application in which the trained model is embedded is stored in second area A2 indicated by addresses 0x08008000 to 0x0803ffff.

As described above, in semiconductor memory 100 to which data has been written using the data writing method according to the comparative example, the trained model is integrated with the application. The trained model therefore cannot be treated the same as a parameter, thereby resulting in a problem as described below.

That is, estimator 412 may not be able to estimate the state of the vehicle with sufficient accuracy unless estimator 412 uses a trained model corresponding to the type of vehicle (electric bicycle 2). The type of vehicle is defined, for example, by the type of a part included in the vehicle (frame 11 or tires 12*a* and 13*a*, for example). Thus, a trained model needs to be created and managed for each type of vehicle.

In semiconductor memory 100, however, the trained model is integrated with the application. As a result, in order to prepare a plurality of types of trained models, a plurality of types of applications as many as the plurality of types of trained models need to be prepared. In other words, when manufacturing semiconductor memory 100, an application in which a trained model is embedded needs to be created and managed for each type of vehicle. In addition, in the data writing method according to the comparative example, the application, corresponding to the type of vehicle, in which the trained model is embedded needs to be written to semiconductor memory 100, instead of only the trained model corresponding to the type of vehicle being written to semiconductor memory 100. Thus, the data writing method according to the comparative example has a problem of having difficulty in writing the trained model to semiconductor memory 100.

In the data writing method according to the embodiment, on the other hand, the bootloader is written to first area A1 in the nonvolatile memory area of semiconductor memory 42, the application that references the trained model is written to second area A2, and the trained model is written to third area A3 as shown in (b) of FIG. 3. In the example shown in (b) of FIG. 3, the bootloader is stored in first area A1 indicated by addresses 0x08000000 to 0x08007fff in semiconductor memory 42. The application is stored in second area A2 indicated by addresses 0x08008000 to 0x08037fff, and the trained model is stored in third area A3 indicated by addresses 0x08038000 to 0x0803ffff. In other words, in semiconductor memory 42, just as second area A2 in which the application is stored is fixed to first area A1 in which the bootloader is stored in the nonvolatile memory area, third area A3 in which the trained model is stored is fixed to first area A1 in which the bootloader is stored and second area A2 in which the application is stored.

As described above, in semiconductor memory 42 to which data has been written using the data writing method according to the embodiment, the trained model is separated from the application. Therefore, the trained model can be treated the same as a parameter, and thus the above-described problem can be solved. In other words, a trained model only needs to be prepared for each type of vehicle in semiconductor memory 42, and a plurality of types of applications as many as the plurality of types of trained models need not be prepared. Specifically, a common application capable of referencing each of the plurality of types of trained models as a parameter only needs to be prepared in semiconductor memory 42. Thus, when manufacturing semiconductor memory 42, only a trained model needs to be created and managed for each type of vehicle. In addition, in the data writing method according to the embodiment, only the trained model needs to be written to semiconductor memory 42, instead of the application in which the trained model is embedded. Thus, the data writing method according to the embodiment has an advantage of facilitating the writing of the trained model to semiconductor memory 42.

Examples of writing a trained model to semiconductor memory 42 using the data writing method according to the embodiment will be listed below.

First Writing Example

Figures 4, 5:
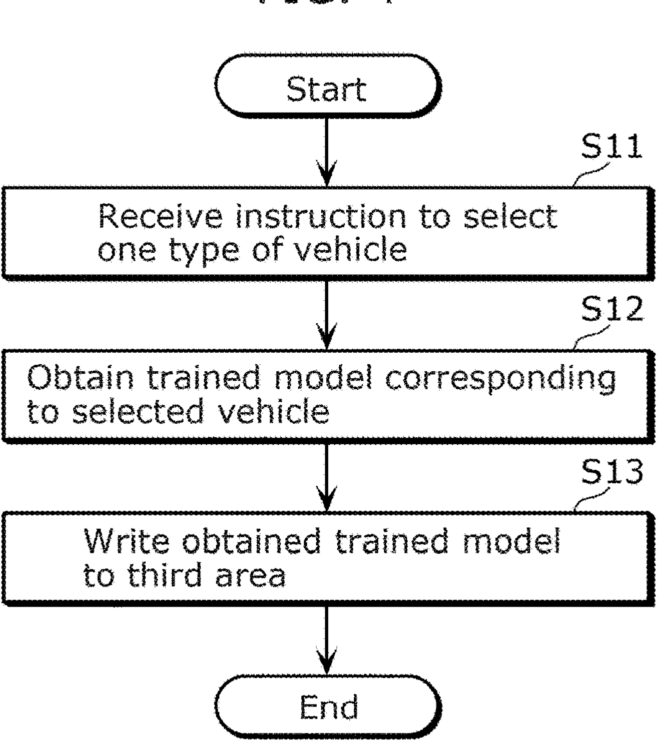
FIG. 4 is a flowchart showing a first writing example of the data writing method according to the embodiment.
FIG. 5 is a diagrammatic illustration showing an example of a user interface used in the first writing example.

FIG. 4 is a flowchart showing a first writing example of the data writing method according to the embodiment. During a stage of manufacturing semiconductor memory 42 at a factory, for example, the first writing example is carried out to write a trained model corresponding to the type of vehicle (electric bicycle 2).

In the first writing example, a data writing device such as a computer installed in the factory, for example, executes the data writing method. Specifically, as shown in FIG. 4, upon receiving an instruction to select a type of vehicle from among a plurality of types of vehicles during the manufacture of semiconductor memory 42 (S11), the data writing device obtains a trained model corresponding to the type of vehicle selected (S12). The data writing device then writes the trained model obtained to third area A3 of semiconductor memory 42 (S13).

In step S12, the data writing device obtains the trained model by reading the trained model corresponding to the type of vehicle from among a plurality of types of trained models corresponding to the plurality of types of vehicles stored in advance in an internal memory or an external storage device, for example.

FIG. 5 is a diagrammatic illustration showing an example of a user interface used in the first writing example. FIG. 5 shows a screen displayed on display 200 included in the data writing device. As shown in FIG. 5, character strings representing a plurality of types (here, six types) of vehicles; option buttons 201 corresponding to the character strings; first button 202 used for inputting an instruction for writing the trained model to semiconductor memory 42; and second button 203 used for inputting an instruction to verify that the trained model has been correctly written to semiconductor memory 42 are displayed on the screen. An operator selects option button 201 corresponding to the desired vehicle type, and then selects first button 202. The data writing device thereby receives an instruction to select the type of vehicle from among the plurality of types of vehicles.

Second Writing Example

FIG. 6 is a flowchart showing a second writing example of the data writing method according to the embodiment. The second writing example is carried out, for example, when a user of a vehicle (electric bicycle 2) selects a trained model to be used from among a plurality of types of trained models by himself/herself to write the trained model to semiconductor memory 42. The second writing example is carried out also when a trained model has been written to semiconductor memory 42 and the trained model is overwritten with an updated trained model or a new trained model.

In the second writing example, a data writing device, such as a computer, for example, executes the data writing method upon receiving an instruction transmitted from information processing terminal 300 (see FIG. 7) such as a smartphone possessed by the user. Specifically, as shown in FIG. 6, upon receiving an instruction to select a type of trained model from among a plurality of types of trained models (S21) after the manufacture of semiconductor memory 42, the data writing device obtains the type of trained model selected (S22). The data writing device then writes the trained model obtained to third area A3 of semiconductor memory 42 (S23).

In step S22, the data writing device obtains the trained model by reading the type of trained model from among the plurality of types of trained models stored in advance in an internal memory or an external storage device, for example.

Figure 7:
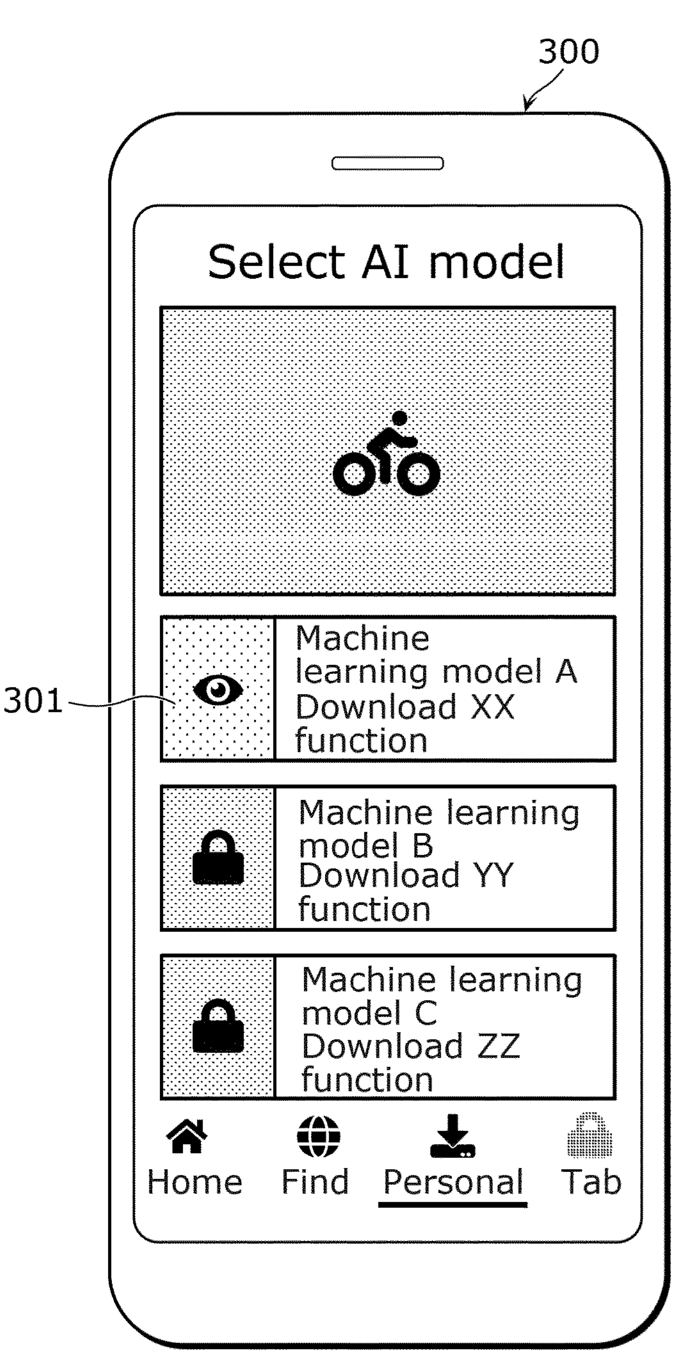
FIG. 7 is a diagrammatic illustration showing an example of a user interface used in the second writing example.

FIG. 7 is a diagrammatic illustration showing an example of a user interface used in the second writing example. FIG. 7 shows a screen displayed on a display included in information processing terminal 300. As shown in FIG. 7, icons 301 representing a plurality of types (here, three types) of trained models are displayed on the screen. The user selects icon 301 corresponding to the desired type of trained model. The data writing device thereby receives an instruction to select the type of trained model from among the plurality of types of trained models.

(Other Variations, Etc.)

The present disclosure has been described above based on the embodiment, but the present disclosure is not limited to the embodiment and the like.

Figure 8:
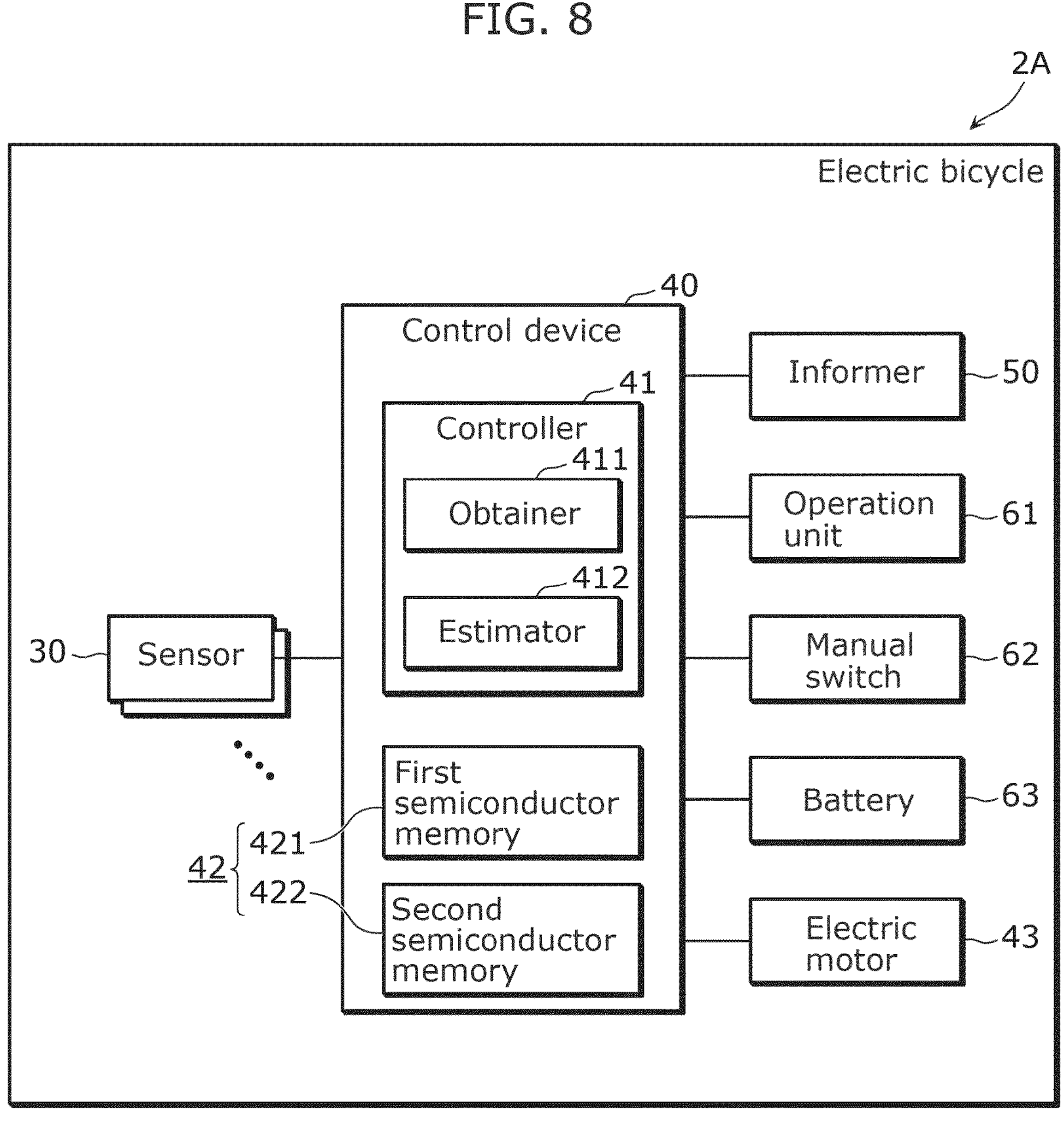
FIG. 8 is a block diagram illustrating an electric bicycle according to a variation of the embodiment.

For example, in the above-described embodiment, a plurality of semiconductor memories 42 may be provided. FIG. 8 is a block diagram illustrating electric bicycle 2A according to a variation of the embodiment. As shown in FIG. 8, in electric bicycle 2A according to the present variation, control device 40 includes a plurality of (here, two) semiconductor memories 42. The plurality of semiconductor memories 42 include: first semiconductor memory 421 including first area A1 and second area A2; and second semiconductor memory 422 including third area A3.

As described above, semiconductor memory 42 in which a trained model is stored (here, second semiconductor memory 422) may be physically separated from semiconductor memory 42 in which a bootloader and an application are stored (here, first semiconductor memory 421). According to such a configuration, second semiconductor memory 422 can be prepared according to a memory capacity required by the trained model. Thus, there is provided an advantage of facilitating the writing of the trained model to semiconductor memory 42 without paying attention to the memory space limitation.

Alternatively, in the above-described embodiment, the number of trained models to be written to semiconductor memory 42 is not limited to one, but may be more than one, for example. In this case, a plurality of trained models are written to a plurality of third areas A3 in the nonvolatile memory area of semiconductor memory 42.

Alternatively, in the above-described embodiment, the trained model may be a model that estimates any other physical quantity different from the air pressures of tires 12*a* and 13*a* of the vehicle, for example. In other words, the trained model may be any model capable of outputting an estimation result for a state (physical quantity) of the vehicle using the vehicle information obtained by obtainer 411 as an input.

Processing units used in electric bicycle 2 (the vehicle) according to the above-described embodiment are typically implemented as an LSI chip, which is an integrated circuit. These processing units may be implemented individually as a single chip, or may be implemented as a single chip to include some or all of the processing units.

Circuit integration is not limited to LSI, but may be implemented by a dedicated circuit or a general-purpose processor. A field programmable gate array (FPGA), which can be programmed after the manufacture of an LSI chip, or a reconfigurable processor, which can reconfigure the connections and settings of circuit cells inside an LSI chip, may also be used.

In the above-described embodiment, each of the elements may be configured by dedicated hardware or realized by executing a software program suitable for the element. Each of the elements may be realized as a result of a program executor, such as a CPU or a processor, reading and executing the software program recorded on a recording medium such as a hard disk or a semiconductor memory.

All numeric values used above are presented by way of example for the purpose of specifically describing the present disclosure.

The division of the functional blocks in each of the block diagrams is presented by way of example. A plurality of functional blocks may be implemented as a single functional block, a single functional block may be divided into a plurality of functional blocks, or some functions may be transferred to other functional blocks. The functions of a plurality of functional blocks with similar functions may be processed by a single piece of hardware or software in parallel or time-division.

The order in which the steps in each of the flowcharts are executed is presented by way of example for the purpose of specifically describing the present disclosure, and therefore those steps may be executed in any order other than the order described above. Some of the above-described steps may be executed simultaneously (in parallel) with other steps.

Forms obtained by making various modifications to the embodiment that can be conceived by those skilled in the art, as well as forms obtained by combining structural components and functions in the embodiment, without materially departing from the spirit of the present disclosure, may be included in the scope of the present disclosure.

Brief Overview

Actions and effects of the data writing method, the recording medium, and the vehicle according to the embodiment will be described below.

As described above, a data writing method according to a first aspect of the present disclosure includes obtaining (S11, S12, S21, S22) and writing (S13, S23). In the obtaining, a trained model constructed in advance by machine learning to estimate a state of a vehicle that is one of a human-powered vehicle or electric bicycle 2 or 2A is obtained. In the writing, the trained model obtained in the obtaining is written, in a nonvolatile memory area of semiconductor memory 42, to third area A3 that is different from both first area A1 in which a bootloader is stored and second area A2 in which an application that references the trained model is stored.

According to this, only the trained model needs to be written to semiconductor memory 42 instead of an application in which a trained model is embedded. Thus, there is provided an advantage of facilitating the writing of the trained model to semiconductor memory 42.

A second aspect of the present disclosure provides the data writing method according to the first aspect in which the trained model is a model that estimates air pressures of tires 12*a* and 13*a* of the vehicle.

According to this, there is provided an advantage of being able to create semiconductor memory 42 including the trained model that estimates the air pressures of tires 12*a* and 13*a* of the vehicle.

A third aspect of the present disclosure provides the data writing method according to the first or second aspect in which in the obtaining, when an instruction to select a type of vehicle from among a plurality of types of vehicles is received (S11) during manufacture of semiconductor memory 42, the trained model corresponding to the type of vehicle is obtained (S12).

According to this, as a result of an operator at a factory selecting the trained model corresponding to the type of vehicle, for example, the trained model is written to semiconductor memory 42. Thus, there is provided an advantage of facilitating the writing of the trained model corresponding to the type of vehicle to semiconductor memory 42.

A fourth aspect of the present disclosure provides the data writing method according to the first or second aspect in which in the obtaining, when an instruction to select a type of trained model from among a plurality of types of trained models is received (S21) after manufacture of semiconductor memory 42, the type of trained model is obtained (S22).

According to this, as a result of a user selecting a trained model of a desired type, for example, the trained model is written to semiconductor memory 42. Thus, there is provided an advantage of facilitating the writing of the desired trained model to semiconductor memory 42 by the user.

A fifth aspect of the present disclosure provides the data writing method according to any one of the first to fourth aspects in which semiconductor memory 42 includes a plurality of semiconductor memories, and the plurality of semiconductor memories 42 include first semiconductor memory 421 including first area A1 and second area A2, and second semiconductor memory 422 including third area A3.

According to this, second semiconductor memory 422 can be prepared according to a memory capacity required by the trained model. Thus, there is provided an advantage of facilitating the writing of the trained model to semiconductor memory 42 without paying attention to the memory space limitation.

A recording medium according to a sixth aspect of the present disclosure is a non-transitory computer-readable recording medium having recorded thereon a program for causing one or more processors to execute the data writing method according to any one of the first to fifth aspects.

According to this, there are provided the same advantages as the data writing method described above.

A vehicle according to a seventh aspect of the present disclosure is one of a human-powered vehicle or electric bicycle 2 or 2A. The vehicle includes: body (frame) 11; semiconductor memory 42 to which data has been written using the data writing method according to any one of the first to fifth aspects; and controller 41. Controller 41 references the trained model stored in third area A3 of semiconductor memory 42 to execute the application stored in second area A2.

According to this, there are provided the same advantages as the data writing method described above.

The invention claimed is:

1. A data writing method comprising:

obtaining a trained model constructed in advance by machine learning to estimate a state of a vehicle that is one of a human-powered vehicle or an electric bicycle;

writing, in a nonvolatile memory area of a semiconductor memory, the trained model obtained in the obtaining to a third area that is different from both a first area in which a bootloader is stored and a second area in which an application that references the trained model is stored; and controlling the vehicle by referencing the trained model stored in the third area of the semiconductor memory to execute the application stored in the second area, wherein the semiconductor memory comprises a plurality of semiconductor memories, and the plurality of semiconductor memories include a first semiconductor memory including the first area and the second area, and a second semiconductor memory including the third area.

2. The data writing method according to claim 1, wherein the trained model is a model that estimates an air pressure of a tire of the vehicle.

3. The data writing method according to claim 1, wherein in the obtaining, when an instruction to select a type of vehicle from among a plurality of types of vehicles is received during manufacture of the semiconductor memory, the trained model corresponding to the type of vehicle is obtained.

4. The data writing method according to claim 1, wherein in the obtaining, when an instruction to select a type of trained model from among a plurality of types of trained models is received after manufacture of the semiconductor memory, the type of trained model is obtained.

5. A non-transitory computer-readable recording medium having recorded thereon a program for causing one or more processors to execute a data writing method comprising:

obtaining a trained model constructed in advance by machine learning to estimate a state of a vehicle that is one of a human-powered vehicle or an electric bicycle;

writing, in a nonvolatile memory area of a semiconductor memory, the trained model obtained in the obtaining to a third area that is different from both a first area in which a bootloader is stored and a second area in which an application that references the trained model is stored; and controlling the vehicle by referencing the trained model stored in the third area of the semiconductor memory to execute the application stored in the second area, wherein the semiconductor memory comprises a plurality of semiconductor memories, and the plurality of semiconductor memories include a first semiconductor memory including the first area and the second area, and a second semiconductor memory including the third area.

6. A vehicle that is one of a human-powered vehicle or an electric bicycle, the vehicle comprising:

a body;

a semiconductor memory to which data has been written by a trained model constructed in advance by machine learning to estimate a state of the vehicle, wherein the trained model is written, in a nonvolatile memory area of the semiconductor memory, to a third area that is different from both a first area in which a bootloader is stored and a second area in which an application that references the trained model is stored; and a controller that controls the vehicle by referencing the trained model stored in the third area of the semiconductor memory to execute the application stored in the second area, wherein the semiconductor memory comprises a plurality of semiconductor memories, and the plurality of semiconductor memories include a first semiconductor memory including the first area and the second area, and a second semiconductor memory including the third area.

* * * * *